United States Patent [19]
Sanford et al.

[11] 3,912,488
[45] Oct. 14, 1975

[54] ELECTRIC FURNACE OUTLET

[75] Inventors: Steve Douglas Sanford, Richmond, Ind.; Vaughn Charles Chenoweth, Hollanburg, Ohio; Duane Harold Faulkner, Cambridge, Ind.

[73] Assignee: Johns-Manville Corporation, Denver, Colo.

[22] Filed: July 25, 1974

[21] Appl. No.: 491,885

[52] U.S. Cl. ............... 65/326; 13/6; 65/DIG. 4; 65/374
[51] Int. Cl.² ........................................ C03B 5/26
[58] Field of Search ........ 65/324, 325, 326, DIG. 4, 65/374 R, 374 M, 374 RM; 13/6

[56] References Cited
UNITED STATES PATENTS

| | | | |
|---|---|---|---|
| 1,680,543 | 8/1928 | Howard | 65/327 X |
| 2,190,296 | 2/1940 | Richardson | 65/325 |
| 2,654,185 | 10/1953 | Honiss | 65/325 |
| 2,777,254 | 1/1957 | Siefert et al. | 65/324 X |
| 2,817,695 | 12/1957 | Hartwig | 65/325 X |
| 3,147,328 | 9/1964 | deBussy | 13/6 |
| 3,305,619 | 2/1967 | Molstedt et al. | 13/6 X |
| 3,429,972 | 2/1969 | deBussy et al. | 13/6 |
| 3,508,904 | 4/1970 | Keefer | 65/326 |
| 3,560,188 | 2/1971 | Winzer | 65/326 X |
| 3,580,976 | 5/1971 | deBussy | 13/6 |
| 3,659,029 | 4/1972 | deBussy | 13/6 |
| 3,736,109 | 5/1973 | Darling et al. | 65/374 RM |
| 3,777,040 | 12/1973 | Gell et al. | 13/6 |

*Primary Examiner*—S. Leon Bashore
*Assistant Examiner*—Frank W. Miga
*Attorney, Agent, or Firm*—Robert M. Krone; John H. Miller

[57] ABSTRACT

A two-stage orifice outlet is provided for an electric furnace. The structure defining the inner orifice having one end in the interior of the furnace and through which molten material passes upon withdrawal from the furnace is made up of a very refractory metal to withstand the high temperatures present within the furnace and this refractory metal must be protected from the damaging oxidizing effects of air. A shielding means consisting essentially of an outer orifice made from a metal such as platinum and a cooling jacket for cooling the outer orifice acts as a shield to prevent the oxidation of the inner orifice. The cooling jacket serves to cool the outer orifice to a temperature below its critical or melting temperature. The present invention eliminates the requirement of prior art electric furnace outlets of a neutral or reducing gas such as hydrogen surrounding the outlet to prevent oxidation of the outlet parts.

15 Claims, 5 Drawing Figures

ELECTRIC FURNACE OUTLET

BACKGROUND OF THE INVENTION

The present invention is related to a furnace outlet and in particular to an improved furnace outlet suitable for use in furnaces for melting high melting point materials.

In furnaces for melting materials such as glass, refractories and other materials having high melting points, the outlet structure must be capable of withstanding high temperatures and atmospheric contact without rapid deterioration. In furnaces such as those disclosed in U.S. Pat. No. 2,790,019 issued Apr. 23, 1957 to C. J. Stalego, single stage outlet members are provided which are made of various metals depending upon the temperature at which they must operate. As shown, these members are hollow and are cooled by the circulation of a cooling medium through their interior to maintain the members below their melting temperature. U.S. Pat. No. 2,978,750 issued Apr. 11, 1961 to J. C. McMullen illustrates another single stage orifice block structure wherein the orifice block is provided with cooling ducts for cooling the orifice block so that a protective layer of refractory material solidifies on the surface of the orifice block to protect the orifice block. Another approach to this problem is illustrated in Russian Pat. No. 129,311 issued in 1960 and U.S. Pat. No. 3,429,970 issued Feb. 25, 1969 to DeBussy. These patents illustrate the use of an inert gas or reducing atmosphere beneath an outlet structure to shield the outlet structure from the atmosphere. The reducing or inert atmosphere prevents oxidation of the outlet structure by the atmosphere at the high operating temperatures experienced at the furnace outlet.

It is an object of the present invention to provide an outlet which, through its two-stage orifice structure, can use those materials in high temperature regions of the outlet which are best suited for such high-temperature conditions and protect those materials from deterioration due to atmospheric attack without the need to utilize a reducing or inert atmosphere beneath the outlet.

A furnace for melting glass refractories and other high melting point materials includes a vessel, means for heating and melting the materials within the vessel, and an outlet extending through the bottom of the vessel from the interior of the furnace to the exterior of the furnace for withdrawing molten material from the vessel. The outlet has two stages. The initial or inner stage includes a structure defining an orifice which is made of a refractory metal so that the structure can withstand the high operating temperatures within this region of the furnace without undergoing rapid deterioration. However, such materials, when operating at these temperatures, undergo rapid oxidation and deterioration if they come into contact with the atmosphere. Consequently, to prevent the rapid deterioration of the structure defining this inner orifice, a second structure defining a second outlet orifice and shielding the inner structure from the atmosphere is provided. This second structure includes a cooling jacket through which a fluid is circulated to maintain the materials utilized in this second stage below their melting temperatures or temperatures at which they will undergo rapid oxidation. In addition to the cooling jacket, the structure of the second stage is insulated from the hotter portions of the outlet to help keep the temperature of the second stage within tolerable limits.

DETAILED DESCRIPTION AND PREFERRED EMBODIMENTS

Figure 1:
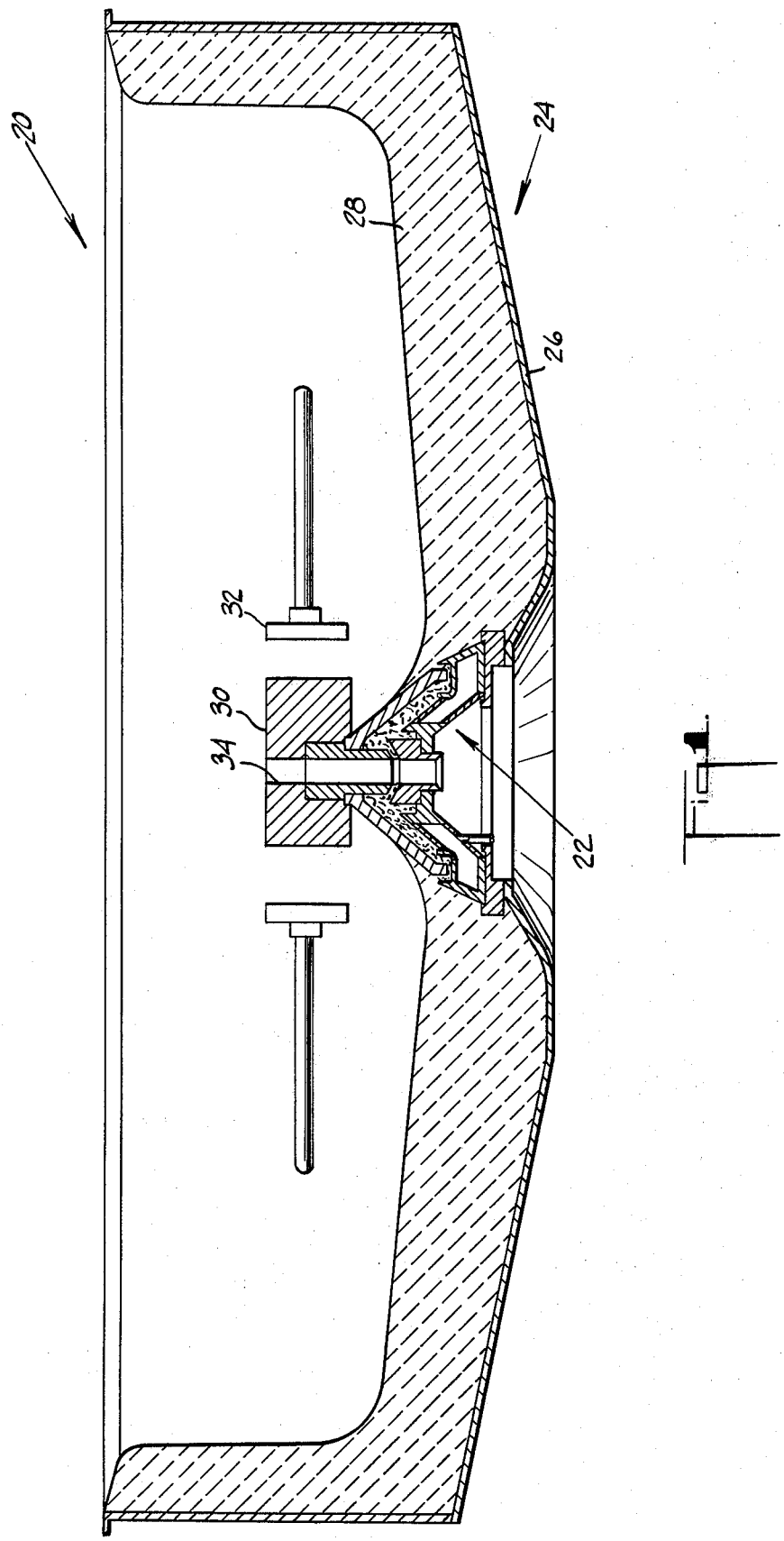
FIG. 1 is a sectional view through a typical furnace utilizing a two-stage outlet structure of the present invention.

FIG. 1 illustrates a typical furnace 20 which can employ a two-stage outlet structure 22 of the present invention. The furnace 20 includes a vessel 24 comprising a metal shell 26 and a ceramic lining 28. The furnace is supported on a conventional support structure not shown.

While the furnace can be heated by other means, such as by gas burners or the like, in the preferred form, the furnace utilizing the outlet of the present invention is an electric furnace. As illustrated in FIG. 1, the furnace includes a central tapping block 30 and a plurality of lateral electrodes 32 which are introduced into the furnace through the sidewalls of the vessel 24. The tapping block 30 and the electrodes 32 are made from molybdenum or other suitable materials which can withstand the high temperatures within the furnace. Current flowing between the electrodes and through the central tapping block 30 heats and melts the material within the furnace by the Joule effect. The melted material is withdrawn from the furnace through the outlet 34 of the two-stage outlet structure 22.

Figure 2:
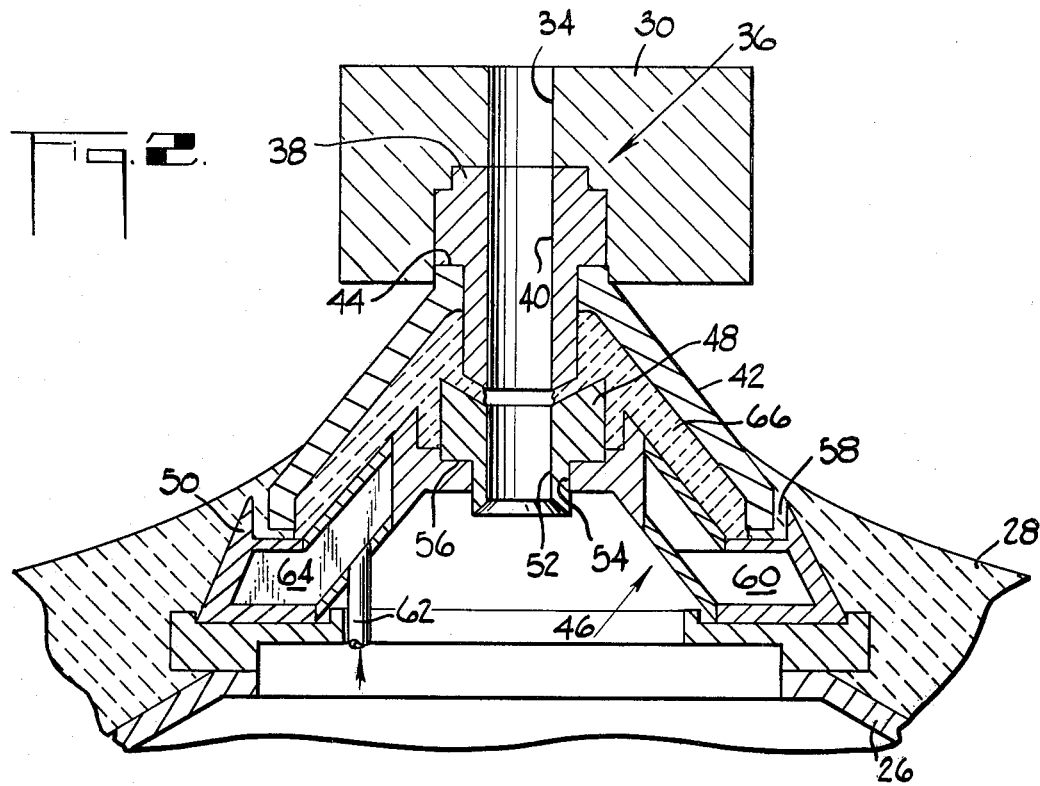
FIGS. 2–5 are sectional views through four embodiments of the two-stage outlet structure of the present invention.

FIGS. 1 and 2 illustrate the same embodiment of the two-stage outlet structure of the present invention. As shown, the two-stage outlet structure 22 includes a first stage 36 comprising a generally tubular-shaped block 38 with an orifice 40 and a frustoconical support member 42. A tubular extension of the block 38 extends through an aperture in the apex of the support member 42 and an annular flange 44 of the block rests on an upper surface of the support member 42. Consequently, the block 38 is supported by the member 42 and in turn the tapping block 30 is mounted on and supported by the block 38.

The orifice 40 forms a portion of the outlet 34. Since this portion of the outlet is subjected to temperatures approaching those temperatures reached within the furnace, e.g., at least 2500°F and in some cases over 3000°F, when melting glass or refractory materials, both the block 38 and the frustoconical support member 42 are made of a refractory metal. While the refractory metal used in the preferred embodiment is molybdenum, refractory metals such as chromium, tungsten, columbium, tantalum and alloys of these metals or equivalent corrosion resistant metals having melting points in excess of 2500°F can be used for the first stage orifice structure.

The second stage orifice structure 46 includes a generally tubular-shaped orifice block 48 and a cooling jacket 50. The block 48 is preferably made of platinum, however, it is contemplated that other metals such as palladium and rhodium, or alloys of these metals, or equivalent metals can be utilized for the block 48. The block 48 is provided with an orifice 52 which forms the lowermost portion of the outlet 34. The orifice 52 is axially aligned with the orifice 40 in the block 38.

The jacket 50 is generally frustoconical in shape and is provided with an aperture 54 in its upper surface through which the block 48 extends. An annular flange 56 on the block 48 rests on and is supported by the upper surface of the jacket 50. An upwardly facing, annular channel 58 extends around the periphery of the jacket. The lower portion of the support 42 is received within and supported by the channel 58. The jacket 50 can be made of stainless steel, copper, or other equivalent metals.

A fluid coolant which may be either gas or liquid in form, such as air or water, is introduced into the generally frustoconical cooling chamber 60 of the jacket 50 through an inlet tube 62. The coolant passes through the chamber and is withdrawn from the chamber through an outlet tube (not shown). The inlet tube and the outlet tube are each located adjacent but on opposite sides of a plate 64 which is located within and functions as a common wall for both ends of the chamber 60. The plate 64 prevents the coolant from passing directly from the inlet tube to the outlet tube and causes the coolant to pass through the entire length of the chamber 60. The jacket thereby functions to cool the block 48 and maintain the block 48 below its critical or melting temperature. In a region between the blocks 38 and 48, the cooling effect of the jacket solidifies any molten material which seeps between the blocks 38 and 40 to form a seal in this region.

A ceramic or refractory insulation or ramming mix 66 is provided between portions of the first and second stages of the outlet structure. This insulation helps to maintain the second stage at a lower temperature than the first stage. Typical refractories which can be used are alumina, beryllia and zirconia or glass fiber insulation suitable for high-temperature usage composed of at least 98% pure quartz. These refractories or mixtures thereof can be ground up and packed between the stages. Once the two-stage structure is placed into operation, the material is subjected to temperatures which cause the ramming mix to harden and this adds strength to the outlet structure.

Figure 3:
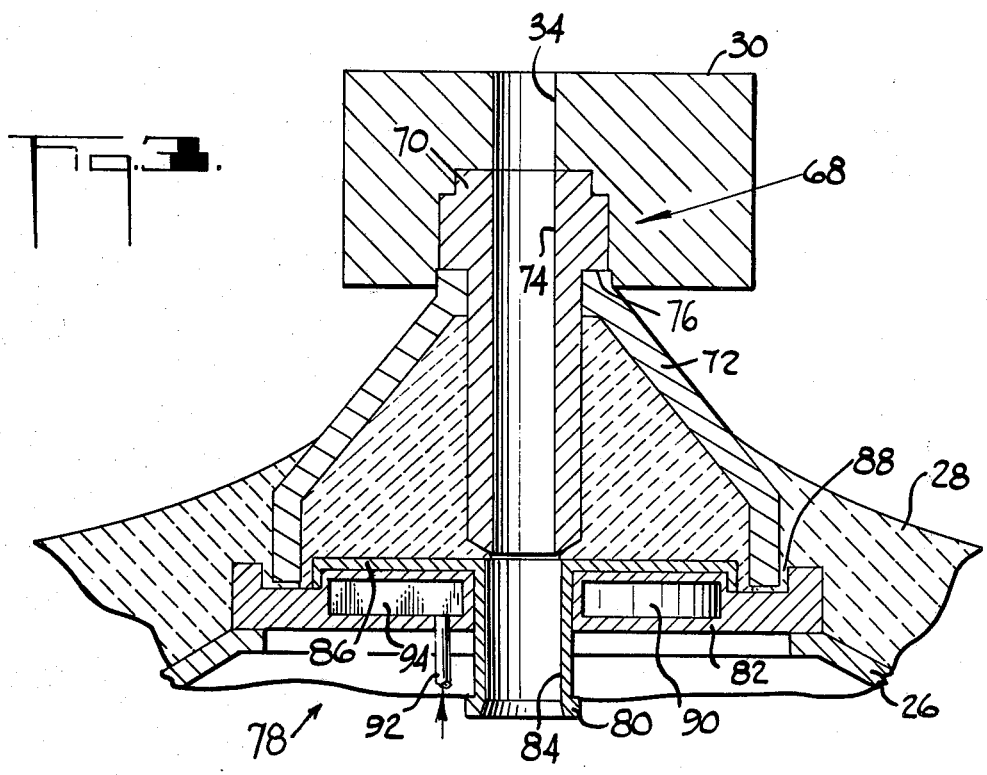

FIG. 3 illustrates a second embodiment of the two-stage outlet structure of the present invention. The materials utilized for the first and second stages plus the refractory insulation utilized between the first and second stages are the same as those utilized in the first embodiment of the present invention. The first stage 68 of the two-stage outlet structure includes a generally tubular-shaped block 70 and a frustoconical support 72. The block 70 is provided with an orifice 74 extending axially through the block which forms an upper portion of the outlet 34. The tubular block 70 extends down through an aperture in the upper surface of the support member 72 and is provided with an annular flange 76 which rests on and is supported by the upper surface of the support member 72. An upper portion of the block 72 is in turn received within a cavity of the tapping block 30 and provides a support for the tapping block 30. As shown, the block 70 terminates at its lower end in a horizontal plane just above the second stage structure and at substantially the same level as the lower portion of the support member 72.

The second stage 78 of the outlet structure includes a generally tubular-shaped block 80 and a cooling jacket 82. The block 80 has an orifice 84 extending axially therethrough which is aligned with the orifice 74 in the block 70 and which forms the lowermost portion of the outlet 34. The annular-shaped flange 86 extends outward from the upper end of the block 80 and overlies the upper surface of the jacket 82. The jacket 82 is generally disc-shaped with a central aperture through which the block 80 extends. An annular channel-shaped groove 88 is provided in the upper surface of the disc adjacent the periphery of the jacket. The lower portion of the support member 72 is received within and supported within this annular-shaped groove. The jacket 82 is provided with an annular cooling chamber 90 which surrounds the upper portion of the block 80 just beneath the annular flange 86. A fluid coolant is introduced into the chamber through an inlet tube 92 and is exhausted from the chamber through an outlet tube not shown. The inlet tube and the outlet tube are each located adjacent but on opposite sides of a plate 94 which is located within and functions as a common wall for both ends of the chamber 90. The plate 94 prevents the coolant from passing directly from the inlet tube to the outlet tube and causes the coolant to pass through the entire length of the chamber 90. Any suitable coolant can be utilized, such as air or water.

Figure 4:
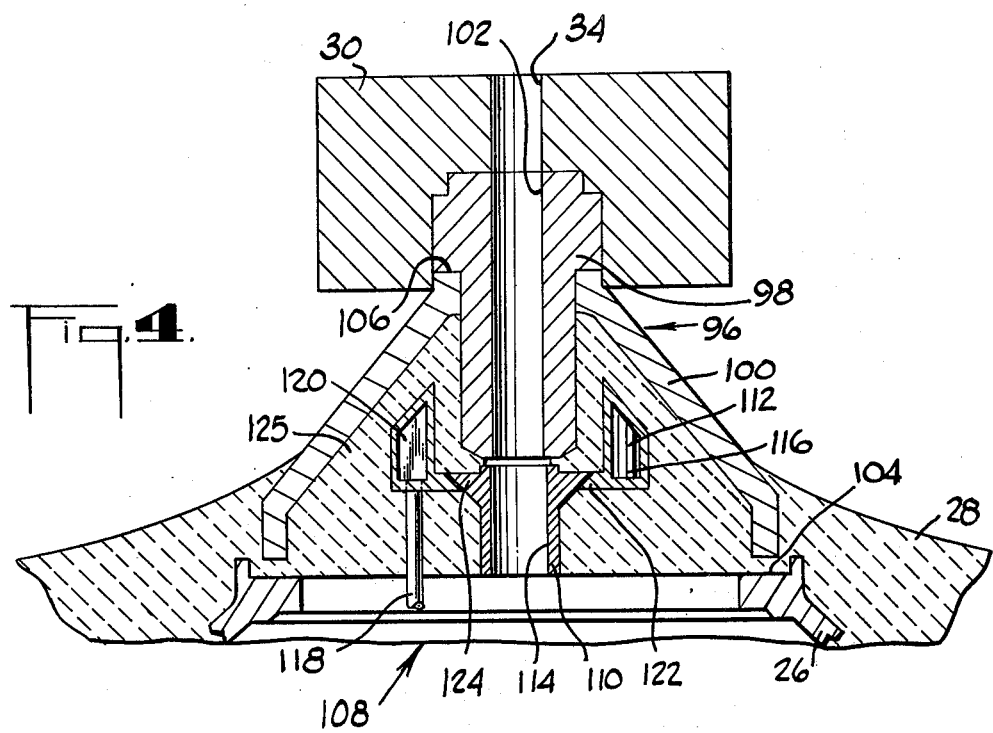

FIG. 4 illustrates a third embodiment of the present invention. The materials used for first and second stages of the outlet structure and the refractory insulation utilized are the same as those utilized in the first embodiment illustrated in FIG. 2. The first stage 96 of the orifice structure includes a generally tubular-shaped block 98 and a frustoconical support member 100. The block 98 is provided with an aperture 102 which extends axially through the block 98 and forms a portion of the outlet 34. The support member 100 is supported on an annular flange 104 of the vessel shell 26. The block 98 passes through the upper surface of the support member 100 with an annular flange 106 on the block engaging the upper surface of the member 100. An upper portion of the block 98 is in turn received within a cavity of the tapping block 30 and supports the tapping block 30.

The second stage 108 of the two-stage orifice structure includes a block 110 and a cooling jacket 112. The block 110 has an orifice 114 passing axially through the block in alignment with the orifice 102 of the block 98. This orifice forms the lowermost portion of the outlet 34. The cooling jacket 112 has a generally hollow annular shape and forms an annular cooling chamber 116. A fluid coolant such as air or water is fed into the chamber through an inlet tube 118 and is exhausted from the chamber through an outlet (not shown). The inlet tube and the outlet tube are each located adjacent but on opposite sides of a plate 120 which is located within and functions as a common wall for both ends of the chamber 116. The plate 120 prevents the coolant from passing directly from the inlet tube to the outlet tube and causes the coolant to pass through the entire length of the chamber 116.

An inwardly extending annular flange 122 adjacent the lower end of the jacket carries an annular flange 124 located adjacent the upper portion of the block 110. In this manner the jacket supports the block 110 which for the most part extends below the cooling jacket. The upper portion of the cooling jacket 112 surrounds the lower portion of the block 98. However, the jacket 112 is spaced outwardly from the block 98. In addition, the upper surface of the jacket 112 is inclined, is spaced from and extends generally parallel to the inner surface of the support member 100. A block of ceramic or refractory insulation 125 encases the block 110 and the jacket 112. The insulation both serves as a support for these members and insulates these members from the inner stage of the orifice structure.

Figure 5:
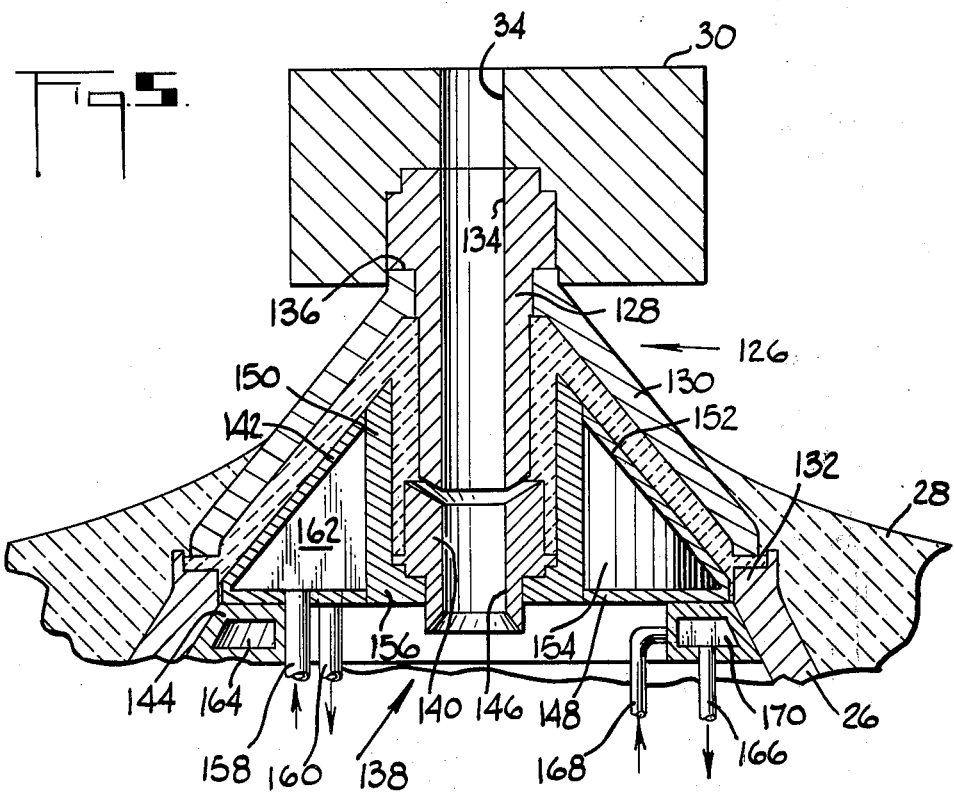

FIG. 5 illustrates the preferred embodiment of the present invention. The materials used for first and second stages of the outlet structure and the refractory insulation utilized in this embodiment are the same as those utilized in the embodiment of FIG. 2. The first stage 126 of the orifice structure includes a generally tubular-shaped block 128 and a frusto-conical support member 130 which is supported by but insulated from an annular flange 132 of the furnace. The block 128 is provided with an orifice 134 which extends axially through the block and forms a portion of the outlet 34. The block 128 extends down through an aperture in the upper surface of the support member 130 and an annular flange 136 of the block rests on the upper surface of the support member 130. An upper portion of the block is received within a cavity of the tapping block 30 and supports the tapping block 30.

The second stage 138 of the two-stage orifice structure includes a block 140 and a pair of cooling jackets 142 and 144. The block 140 has an orifice 146 passing axially through the block in alignment with the orifice 134 of the block 128. This orifice forms the lowermost portion of the outlet 34.

The cooling jacket 142 is defined by an annular, generally horizontally extending bottom wall 148, a hollow, cylindrical inner wall 150 and a conical outer wall 152. The inner and outer walls extend upward from the bottom wall and merge at their upper extremities to define a cooling chamber 154. An annular flange 156 extending inwardly from the lower extremity of the inner wall 150 provides a support for an annular flange of the orifice block 140.

The cooling chamber 154 has an inlet tube 158 and an outlet tube 160 for introducing coolant into and removing coolant from the chamber. The inlet tube and the outlet tube are each located adjacent but on opposite sides of a plate 162 which is located within and functions as a common wall for both sides of the chamber 154. The plate 162 prevents the fluid coolant from passing directly from the inlet tube to the outlet tube and causes the coolant to pass through the entire length of the chamber 154.

The second cooling jacket 144 is located beneath and welded or otherwise secured to the periphery of the first cooling jacket 142. The second cooling jacket is a hollow annular jacket defining an annular cooling chamber 164. The cooling jacket 144 is provided with an inlet tube 166 and an outlet tube 168 which are located adjacent but on opposite sides of a plate 170 that functions as a common wall for both ends of the cooling chamber. The plate causes the coolant to pass through the entire length of the chamber 164. The second cooling jacket supplements the cooling effect of the first jacket and in the event one of the cooling jackets develops a leak or becomes otherwise inoperative, the other cooling jacket is capable of cooling the second stage of the outlet to allow continued operation of the two-stage outlet.

In operation, molten material such as glass is extracted from the furnace 20 through the outlet 34. In all four embodiments, the outlet 34 includes a first and second stage orifice structure.

The first stage orifice structure is subjected to the high operating temperatures existing within the furnace with portions of the structure actually being in contact with the molten material within the furnace. Consequently, this stage of the structure must be made of a material which can withstand the high temperatures experienced within the furnace without rapid deterioration. The materials utilized are refractory metals. While these refractory metals exhibit good resistance to deterioration at the temperatures reached in the first stage, e.g., temperatures above 2500°F, these materials are very susceptible to oxidation at these temperatures. Consequently, the second stage orifice structure is provided. While the materials utilized in this structure are not able to withstand the temperatures reached in the first stage, this second stage is insulated from the first stage and is cooled so that the materials utilized in the second stage are at a temperature below their melting point and a temperature at which they will not undergo rapid oxidation when exposed to the atmosphere. Consequently, the second stage provides a shield for the first stage.

If there is a space between the orifice blocks of the first and second stages of the outlet, the cooling jacket or jackets cool this region sufficiently to solidify any molten material which seeps into this region to thereby seal the region and prevent the glass from attacking the components of the second stage. If the molybdenum block of the first stage and the platinum block of the second stage are initially in contact and if the temperature of these blocks is high enough, the molybdenum will act to reduce the platinum and the platinum will act to oxidize the molybdenum. If this takes place, a slight erosion will occur. However, glass will then enter the region and be solidified to stop this unwanted reaction.

We claim:

1. In an electric furnace for melting glass and other high melting point materials at temperatures exceeding 2500°F, said furnace including a vessel, means for electrically heating and melting the materials within the vessel, and an outlet means extending through a wall of said vessel from the interior of said furnace to the exterior of said furnace for withdrawing molten material from said vessel, the improvement comprising:

said outlet means including a first outlet orifice having one end in the interior of said vessel and through which molten material passes upon withdrawal from said vessel, said first outlet orifice comprising a corrosion resistant metal having a melting point in excess of 3000°F, but which must be protected from an oxidizing atmosphere at the temperature of the molten material, and means for shielding said first outlet orifice from an oxidizing atmosphere without the need for the use of a neutral or reducing gas surrounding the outlet, said shielding means consisting essentially of a second outlet orifice below said first outlet orifice, said second outlet orifice being made from a refractory metal having a higher oxidation resistance than the metal in said first outlet orifice, and fluid cooling means at least surrounding said second outlet orifice for maintaining said second outlet orifice at a temperature below its critical or melting temperature.

2. The improvement as defined in claim 1 wherein said first outlet orifice is made from a very refractory metal selected from a group consisting of molybdenum, chromium, tungsten, columbium, tantalum, and alloys thereof.

3. The improvement as defined in claim 2 wherein said first outlet orifice is made from molybdenum.

4. The improvement as defined in claim 1 wherein said second outlet orifice is made from a metal selected from the group consisting of platinum, palladium, rhodium, and alloys thereof.

5. The improvement as defined in claim 2 wherein said second outlet orifice is made from a metal selected from a group consisting of platinum, palladium, rhodium, and alloys thereof.

6. The improvement as defined in claim 3 wherein said second outlet orifice is made from platinum.

7. The improvement as defined in claim 5 wherein said second outlet orifice is made from platinum.

8. The improvement as defined in claim 1 wherein said cooling means is a cooling jacket and through said jacket the fluid is circulated to dissipate heat.

9. The improvement as defined in claim 1 wherein said cooling means comprises first and second cooling jackets which each have an independent inlet and outlet means for coolant which is circulated through said jacket.

10. The improvement as defined in claim 6 wherein refractory insulation is disposed between said first outlet orifice and said shielding means.

11. The improvement as defined in claim 10 wherein said insulating material comprises a ceramic material.

12. The improvement as defined in claim 1 wherein said second outlet orifice is spaced from said first outlet orifice, and said fluid cooling means adjacent said space for cooling this space to solidify any molten material passing into this space.

13. The improvement as defined in claim 12 wherein ceramic refractory insulation material is disposed in said space.

14. The improvement as defined in claim 1 wherein said fluid cooling means surrounds a lower portion of said first outlet orifice and an upper portion of said second outlet orifice.

15. The improvement as defined in claim 12 wherein said fluid cooling means surrounds at least a portion of said second outlet orifice and terminates below a lower end of said first outlet orifice.

* * * * *

UNITED STATES PATENT AND TRADEMARK OFFICE
CERTIFICATE OF CORRECTION

PATENT NO. : 3,912,488
DATED : October 14, 1975
INVENTOR(S) : Steve D. Sanford et al It is certified that error appears in the above-identified patent and that said Letters Patent are hereby corrected as shown below:

Column 5, line 14 "frusto-conical" should read --frustoconical--

Column 6, line 64 (Claim 1) "partially" should follow after --means at least--

Signed and Sealed this thirtieth Day of March 1976

[SEAL]

Attest:

RUTH C. MASON
Attesting Officer

C. MARSHALL DANN
Commissioner of Patents and Trademarks